(12) United States Patent
Ma et al.

(10) Patent No.: US 12,355,875 B2
(45) Date of Patent: Jul. 8, 2025

(54) CONFERENCE DATA TRANSMISSION METHOD, APPARATUS AND SYSTEM, ELECTRONIC DEVICE AND READABLE MEDIUM

(71) Applicant: BOE TECHNOLOGY GROUP CO., LTD., Beijing (CN)

(72) Inventors: Xitong Ma, Beijing (CN); Tao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/016,425

(22) PCT Filed: Jan. 27, 2022

(86) PCT No.: PCT/CN2022/074249
§ 371 (c)(1),
(2) Date: Jan. 16, 2023

(87) PCT Pub. No.: WO2023/141864
PCT Pub. Date: Aug. 3, 2023

(65) Prior Publication Data
US 2024/0259195 A1 Aug. 1, 2024

(51) Int. Cl.
*H04L 9/08* (2006.01)
(52) U.S. Cl.
CPC .................... *H04L 9/088* (2013.01)
(58) Field of Classification Search
CPC .......... G06F 3/048; G06F 3/00; G06F 3/0482; G06F 15/7825; G06F 1/10;
(Continued)

(56) References Cited

U.S. PATENT DOCUMENTS

2001/0005883 A1* 6/2001 Wray .................... H04L 63/123
713/153
2006/0080451 A1* 4/2006 Eckert ..................... H04L 69/06
709/230

(Continued)

FOREIGN PATENT DOCUMENTS

CN 105828017 A 8/2016
CN 104506793 B 4/2018

(Continued)

*Primary Examiner* — Sharif E Ullah
(74) *Attorney, Agent, or Firm* — HOUTTEMAN LAW LLC

(57) ABSTRACT

A conference data transmission method, an apparatus and a system, an electronic device and a readable medium are disclosed, belong to the technical field of computers and can avoid the illegal intrusion in the prior art. The conference data transmission method includes: receiving unencrypted first conference data transmitted by a conference transmission device in a case where an identity verification of a participant is passed; acquiring a conference key corresponding to the first conference data, and encrypting the first conference data through the conference key, to obtain encrypted second conference data; and transmitting the encrypted second conference data to the conference transmission device, so that the conference transmission device provides the encrypted second conference data to a conference client through a cloud platform. The present disclosure can improve the security of conference data transmission and avoid the problem of cracking in the data transmission process.

11 Claims, 8 Drawing Sheets

(58) Field of Classification Search
CPC ............ G06F 11/3632; H04L 61/4511; H04L 63/1416; H04L 63/1425; H04L 41/5054; H04L 12/1407; H04L 41/5019; H04L 67/306; H04L 41/0894; H04L 63/0227; H04L 63/0236; H04L 9/085; H04L 9/088
USPC ........ 713/171, 150, 163, 181; 726/2, 21, 36; 380/255, 264, 276
See application file for complete search history.

(56) References Cited

U.S. PATENT DOCUMENTS

| | | | |
|---|---|---|---|
| 2007/0162751 A1* | 7/2007 | Braskich | H04L 63/0869 |
| | | | 713/169 |
| 2007/0280163 A1* | 12/2007 | Zhang | H04W 84/18 |
| | | | 370/331 |
| 2008/0263648 A1* | 10/2008 | Sathyan | H04L 63/0428 |
| | | | 726/7 |
| 2009/0271502 A1* | 10/2009 | Xue | H04L 67/104 |
| | | | 709/219 |
| 2011/0131417 A1* | 6/2011 | Swander | H04L 9/3263 |
| | | | 713/176 |
| 2012/0167210 A1* | 6/2012 | Oro Garcia | H04L 63/101 |
| | | | 726/22 |
| 2013/0282865 A1* | 10/2013 | Baptist | H04L 67/51 |
| | | | 709/217 |
| 2014/0052888 A1* | 2/2014 | Wagner | F25D 29/003 |
| | | | 702/50 |
| 2016/0099852 A1* | 4/2016 | Cook | H04L 63/0272 |
| | | | 709/224 |
| 2018/0109494 A1* | 4/2018 | Yu | H04L 63/1441 |
| 2019/0058579 A1* | 2/2019 | Hammon | G06F 7/588 |
| 2019/0130100 A1* | 5/2019 | Dymshits | G06F 16/90335 |
| 2020/0145454 A1* | 5/2020 | Galliano | H04L 61/4511 |
| 2021/0203883 A1* | 7/2021 | Chu | H04N 7/147 |
| 2023/0163959 A1* | 5/2023 | Zeng | H04L 9/0841 |
| | | | 713/171 |
| 2023/0171090 A1* | 6/2023 | Yin | H04L 9/14 |
| | | | 713/171 |
| 2023/0186766 A1* | 6/2023 | Roy | G08G 1/087 |
| | | | 701/117 |

FOREIGN PATENT DOCUMENTS

| | | | |
|---|---|---|---|
| CN | 110475095 | A | 11/2019 |
| CN | 110489979 | * | 11/2019 |
| CN | 110489979 | A | 11/2019 |
| CN | 110505201 | A | 11/2019 |
| CN | 111355921 | A | 6/2020 |
| CN | 202010284647 | * | 6/2020 |
| CN | 111405234 | A | 7/2020 |
| CN | 112653868 | A | 4/2021 |
| CN | 112672098 | A | 4/2021 |
| CN | 113132675 | A | 7/2021 |
| CN | 113141484 | A | 7/2021 |

* cited by examiner

CONFERENCE DATA TRANSMISSION METHOD, APPARATUS AND SYSTEM, ELECTRONIC DEVICE AND READABLE MEDIUM

TECHNICAL FIELD

The present disclosure belongs to the technical field of computers, and particularly relates to a conference data transmission method, an apparatus and a system, an electronic device and a readable medium.

BACKGROUND

With the development of internet technology, more and more conferences are held online. Participants of the online conference may access the network by using a terminal device such as a mobile phone, a computer or the like, and communicate with each other by transmitting data on the network. For example, software with a chat function or an online conference function may be used to initiate an online conference.

However, conference content of a conventional online conference is generally transmitted in a plaintext form, so that the content is easily attacked or leaked. Therefore, a conventional conference transmission device can only meet requirements of the conventional conference, and cannot be applied to an important conference with higher security level.

SUMMARY

The present disclosure aims to provide a conference data transmission method, an apparatus and a system, an electronic device and a readable medium.

A first aspect of the present disclosure provides a conference data transmission method for a security enhancement module, including: receiving unencrypted first conference data transmitted by a conference transmission device in a case where an identity verification of a participant is passed; acquiring a conference key corresponding to the first conference data, and encrypting the first conference data through the conference key, to obtain encrypted second conference data; and transmitting the encrypted second conference data to the conference transmission device, so that the conference transmission device provides the encrypted second conference data to a conference client through a cloud platform.

In an optional implementation, the acquiring a conference key corresponding to the first conference data, and encrypting the first conference data through the conference key, to obtain encrypted second conference data, includes: generating the conference key corresponding to the first conference data, and encrypting the first conference data through the conference key; encrypting the conference key through a security key provided by the cloud platform, to obtain a cipher key; obtaining the second conference data according to the encrypted first conference data and the cipher key.

In an optional implementation, the conference key is calculated by the security enhancement module from module information; or the conference key is determined by the security enhancement module according to a data type of the first conference data.

In an optional implementation, prior to the encrypting the conference key with the security key provided by the cloud platform, the method further includes: receiving the security key returned by the cloud platform in response to a key negotiation request transmitted by the conference transmission device; wherein the security key is generated according to a device service type and/or a device authentication type of the conference transmission device.

In an optional implementation, the receiving the security key returned by the cloud platform in response to a key negotiation request transmitted by the conference transmission device includes: receiving a first key obtained after the cloud platform encrypts the security key through a platform private key; and decrypting the first key through a pre-acquired platform public key, to obtain the security key.

In an optional implementation, the identity verification of the participant includes: receiving identity recognition data transmitted by the conference transmission device; matching the identity recognition data with security verification data pre-stored in the security enhancement module, and determining an identity recognition result corresponding to the identity recognition data according to a matching result; transmitting the identity recognition result to the conference transmission device, so that the conference transmission device performs the identity verification on the participant according to the identity recognition result.

In an optional implementation, prior to receiving the identity recognition data transmitted by the conference transmission device, the method further includes: receiving and storing the security verification data from an upper computer; wherein the security verification data from the upper computer is in a ciphertext form; matching the identity recognition data with security verification data pre-stored in the security enhancement module, includes: decrypting the security verification data in the ciphertext form through a verification key, to obtain the security verification data in a plaintext form; and matching the identity recognition data with the security verification data in the plaintext form.

In an optional implementation, the identity recognition data transmitted by the conference transmission device includes device collection data for identifying the identity of the participant; the security verification data includes: feature data and identification information of a registered member; the identity recognition result corresponding to the identity recognition data includes: identification information of the participant; wherein the device collection data includes at least one of: face image data, iris image data, fingerprint data, and password data; and the identification information includes: a name, a unique identifier, profile information.

In an optional implementation, prior to the identity verification of the participant, the method further includes: receiving and storing a platform certificate generated by the cloud platform in response to a device registration request; adding auxiliary verification data for the platform certificate in response to an authentication instruction transmitted by the conference transmission device, to obtain a module certificate; and transmitting the module certificate to the conference transmission device, so that the conference transmission device provides the module certificate to the cloud platform for a device authentication; wherein the identity verification of the participant is performed in a case where the device authentication is passed.

In an optional implementation, the security enhancement module communicates with the conference transmission device through a preset application interface; wherein the preset application interface is provided by a software development kit corresponding to the security enhancement module.

A second aspect of the present disclosure provides a conference data transmission method for a conference transmission device, including: transmitting unencrypted first conference data to a security enhancement module in a case where an identity verification of a participant is passed; receiving encrypted second conference data obtained by encrypting the first conference data through an acquired conference key by the security enhancement module; and transmitting the encrypted second conference data to a cloud platform, so that the cloud platform provides the second conference data to a conference client.

In an optional implementation, the conference key is generated by the security enhancement module, and the second conference data further includes: a cipher key obtained by encrypting the conference key through a security key provided by the cloud platform.

In an optional implementation, prior to the receiving encrypted second conference data obtained by encrypting the first conference data through an acquired conference key by the security enhancement module, the method further includes: transmitting a key negotiation request to the cloud platform; providing the security key from the cloud platform to the security enhancement module according to a result returned by the cloud platform; wherein the security key is generated according to a device service type and/or a device authentication type of the conference transmission device.

In an optional implementation, the providing the security key from the cloud platform to the security enhancement module includes: transmitting a first key obtained by encrypting the security key by the cloud platform through a platform private key to the security enhancement module, so that the security enhancement module decrypts the first key through the pre-acquired platform public key, to obtain the security key.

In an optional implementation, prior to the transmitting unencrypted first conference data to a security enhancement module, the method further includes: transmitting acquired identity recognition data to the security enhancement module; receiving an identity recognition result returned by the security enhancement module after matching the identity recognition data with pre-stored security verification data; and matching the identity recognition result with personnel identity information in a participant configuration request received from the cloud platform, and verifying an identity of the participant according to a matching result.

In an optional implementation, prior to the identity verification of the participant, the method further includes: transmitting a device registration request to the cloud platform, so that the security enhancement module receives and stores a platform certificate generated by the cloud platform in response to the device registration request; transmitting an authentication instruction to the security enhancement module, so that the security enhancement module adds auxiliary verification data for the platform certificate, to obtain a module certificate; and transmitting the received module certificate from the security enhancement module to the cloud platform for a device authentication by the cloud platform.

In an optional implementation, the conference transmission device communicates with the cloud platform through a first communication protocol, and the conference transmission device communicates with the security enhancement module through a second communication protocol; wherein the first communication protocol includes: an MQTT protocol, and the second communication protocol includes: a USB protocol.

A third aspect of the present disclosure provides a conference data transmission method for a conference client, including: acquiring, from a cloud platform, encrypted second conference data from a conference transmission device; wherein the second conference data is obtained by encrypting first conference data provided by the conference transmission device through a conference key by a security enhancement module; and acquiring the conference key, and decrypting the second conference data through the conference key, to obtain unencrypted first conference data.

In an optional implementation, the acquiring the conference key includes: acquiring a cipher key in the second conference data; wherein the cipher key is obtained by encrypting the conference key through a security key provided by the cloud platform; decrypting the cipher key through the security key provided by the cloud platform, to obtain the conference key.

A fourth aspect of the present disclosure provides a conference data transmission apparatus, including: a receiving module configured to receive unencrypted first conference data transmitted by a conference transmission device in a case where an identity verification of a participant is passed; an encryption module configured to acquire a conference key corresponding to the first conference data, and encrypt the first conference data through the conference key, to obtain encrypted second conference data; and a transmitting module configured to transmit the encrypted second conference data to the conference transmission device, so that the conference transmission device provides the encrypted second conference data to a conference client through a cloud platform.

A fifth aspect of the present disclosure provides a conference data transmission apparatus, including: a first transmitting module configured to transmit unencrypted first conference data to a security enhancement module in a case where an identity verification of a participant is passed; a receiving module configured to receive encrypted second conference data obtained by encrypting the first conference data by the security enhancement module through an acquired conference key; and a second transmitting module configured to transmit the encrypted second conference data to a cloud platform, so that the cloud platform provides the second conference data to a conference client.

A sixth aspect of the present disclosure provides a conference client, including: an acquisition module configured to acquire, from a cloud platform, encrypted second conference data from a conference transmission device; wherein the second conference data is obtained by encrypting first conference data provided by the conference transmission device through a conference key by a security enhancement module; and a decryption module configured to obtain the conference key, and decrypt the second conference data through the conference key, to obtain unencrypted first conference data.

A seventh aspect of the present disclosure provides a conference transmission system, including: the data transmission apparatus of the fifth aspect, the data transmission apparatus of the sixth aspect, the conference client of the seventh aspect, and a cloud platform.

An eighth aspect of the present disclosure provides an electronic device, including: one or more processors; a memory having one or more programs stored thereon that, when executed by the one or more processors, cause the one or more processors to implement the method of any one of the above embodiments; one or more I/O interfaces connected between the one or more processors and the memory and configured to enable information interaction between the one or more processors and the memory.

A ninth aspect of the present disclosure provides a computer readable medium having stored thereon a computer program which, when executed by a processor, implements the method of any one of the above embodiments.

BRIEF DESCRIPTION OF DRAWINGS

The accompanying drawings, which are provided for further understanding of embodiments of the present disclosure and constitute a part of this specification, are for explaining the present disclosure together with the embodiments of the present disclosure, but are not intended to limit the present disclosure. In the drawings.

DETAIL DESCRIPTION OF EMBODIMENTS

In order to enable one of ordinary skill in the art to better understand the technical solutions of the present disclosure/utility model, the present disclosure/utility model will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

In a first aspect, an embodiment of the present disclosure provides a conference data transmission method, which improves reliability of conference data transmission through a security enhancement module, and avoids a data leakage caused by an attack on a conference transmission device.

Figure 1:
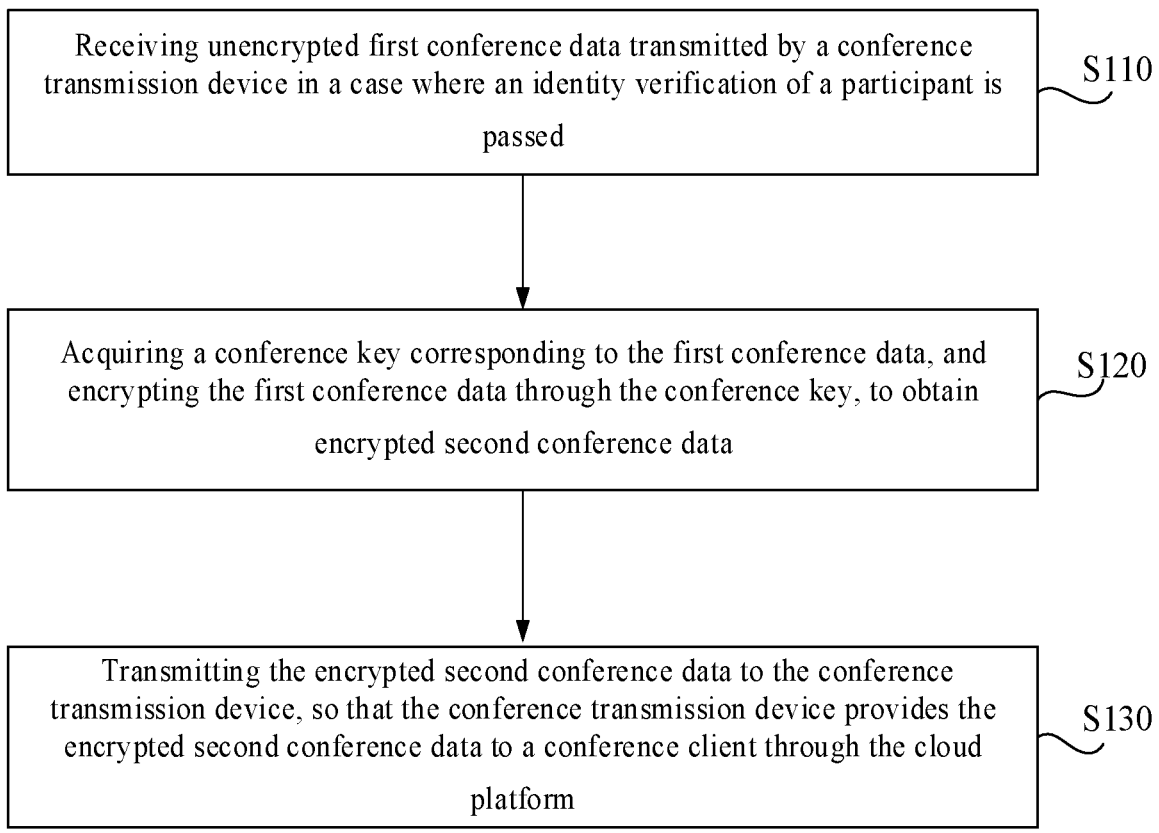
FIG. 1 is a flowchart of a conference data transmission method applied to a security enhancement module according to an embodiment of the present disclosure.

As shown in FIG. 1, the conference data transmission method provided in the embodiment of the present disclosure may be applied to the security enhancement module. The security enhancement module may be connected to a conference transmission device in a plug-in mode, and the conference transmission device communicates with a cloud platform. The method includes following steps:

Step S110: receiving unencrypted first conference data transmitted by a conference transmission device in a case where an identity verification of a participant is passed.

A main body performing the steps in the embodiment may be a security enhancement module. The security enhancement module may communicate with the conference transmission device.

In order to improve the security and prevent an intervention of a person irrelevant to the conference, the identity of the participant needs to be verified in advance. In a case where the identity verification is passed, the conference is started and conference data is transmitted through the network. The specific implementation of the identity verification is not limited in the present disclosure, as long as it can ensure that the identity of the participant is legal.

The conference transmission device acquires the unencrypted first conference data after the conference is started. The unencrypted first conference data is generated from conference content. The conference transmission device transmits the first conference data to the security enhancement module. Correspondingly, the security enhancement module receives the unencrypted first conference data transmitted by the conference transmission device.

Step S120: acquiring a conference key corresponding to the first conference data, and encrypting the first conference data through the conference key, to obtain encrypted second conference data.

In order to improve the security, data in a plaintext form is not directly transmitted, but encrypted data in a ciphertext form is transmitted in the transmission. The conference key may be obtained in various ways. For example, the conference key may be obtained from a cloud platform in advance. As another example, the conference key may alternatively be generated by the security enhancement module and provided to the cloud platform. In summary, no matter how the conference key is generated, the core of the present disclosure is: the conference key is stored in the security enhancement module, and cannot be obtained by external conference transmission devices, so that the security is improved.

Step S130: transmitting the encrypted second conference data to the conference transmission device, so that the conference transmission device provides the encrypted second conference data to a conference client through the cloud platform.

The security enhancement module transmits the encrypted second conference data to the conference transmission device, so that the conference transmission device provides the second conference data to the cloud platform, which provides the second conference data to the conference client.

Therefore, in this way, the conference data may be encrypted by the security enhancement module. The encryption process and the decryption process are completed inside the security enhancement module, so that the security is improved, and the risk of data leakage is avoided.

Figure 2:
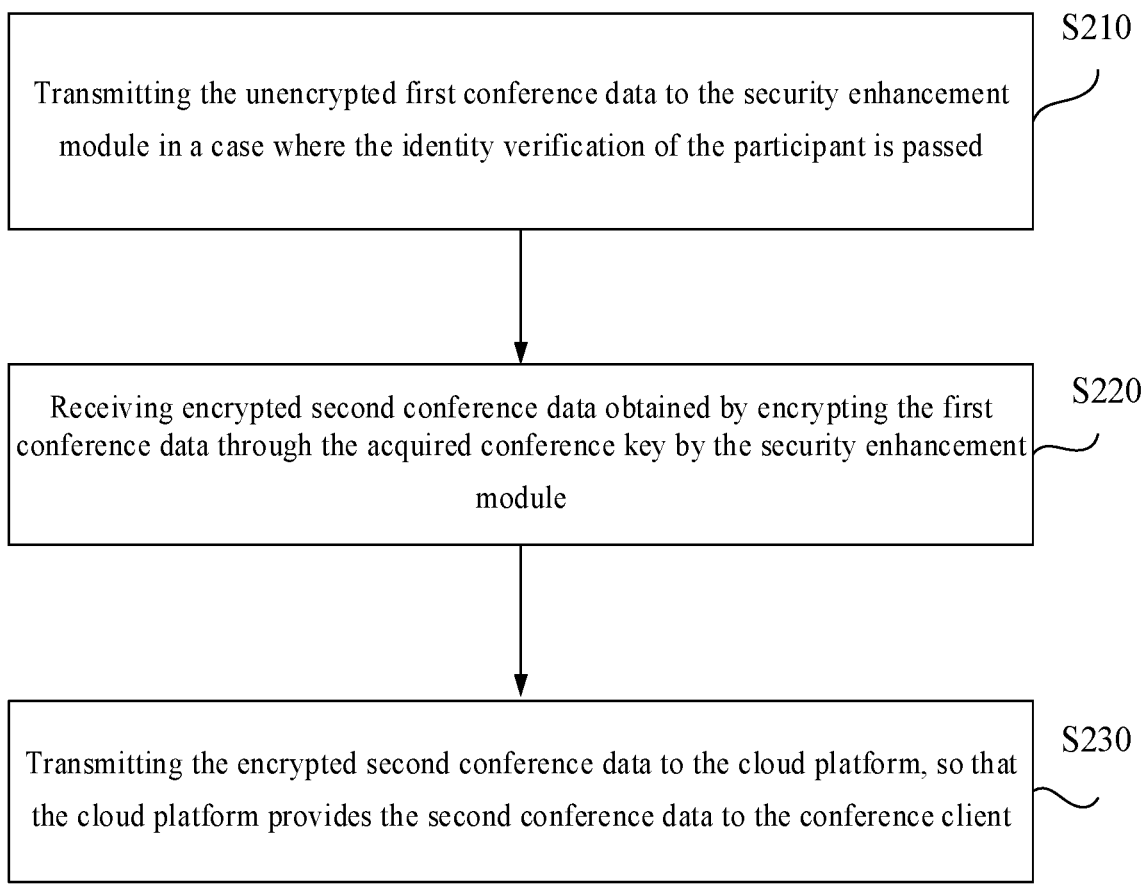
FIG. 2 is a flowchart of a conference data transmission method applied to a conference transmission device according to an embodiment of the present disclosure.

As shown in FIG. 2, a conference data transmission method provided in the embodiment of the present disclosure may be applied to a conference transmission device. The method includes:

Step S210: transmitting the unencrypted first conference data to the security enhancement module in a case where the identity verification of the participant is passed.

A main body performing the steps in the embodiment may be the conference transmission device. The conference transmission device acquires the unencrypted first conference data after the conference is started. The unencrypted first conference data is generated from the conference content. The conference transmission device transmits the first conference data to the security enhancement module.

Step S220: receiving encrypted second conference data obtained by encrypting the first conference data through the acquired conference key by the security enhancement module.

Step S230: transmitting the encrypted second conference data to the cloud platform, so that the cloud platform provides the second conference data to the conference client.

The cloud platform is configured to provide the received second conference data to the conference client, so as to be downloaded by the conference client.

In this way, the security of data transmission is improved by means of a multi-terminal interaction process among the security enhancement module, the conference transmission device, the cloud platform and the conference client.

Figure 3:
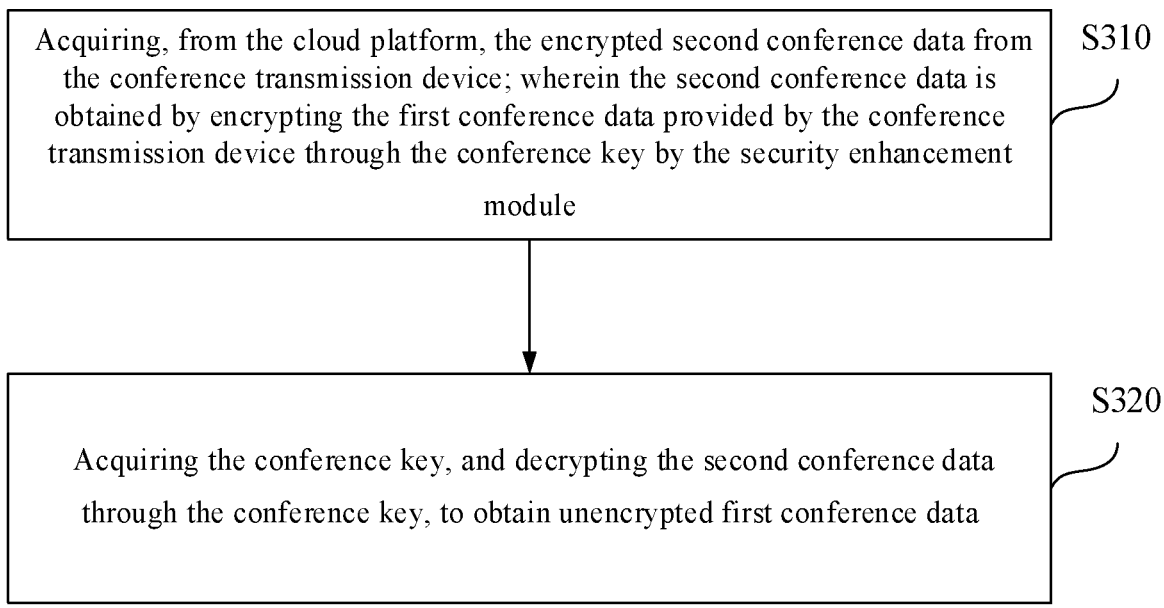
FIG. 3 is a flowchart of a conference data transmission method applied to a conference client according to an embodiment of the present disclosure.

As shown in FIG. 3, a conference data transmission method provided by the embodiment of the present disclosure may be applied to a conference client. The method includes:

Step S310: acquiring, from the cloud platform, the encrypted second conference data from the conference transmission device; wherein the second conference data is obtained by encrypting the first conference data provided by the conference transmission device through the conference key by the security enhancement module.

A main body performing the steps in the embodiment may be the conference client. The conference client may be various types of communication terminals such as a mobile terminal and a tablet computer. The conference client may acquire the second conference data in various ways such as a download entry and a shared two-dimensional code. The specific way of acquiring the second conference data is not limited in the present disclosure.

Step S320: acquiring the conference key, and decrypting the second conference data through the conference key, to obtain unencrypted first conference data.

The conference key may be acquired in various ways. For example, the conference key may be provided by the cloud platform. Correspondingly, the second conference data may be decrypted through the conference key to obtain the original first conference data.

In this way, the conference client may directly download the second conference data in the ciphertext form through the encryption process and the decryption process by the security enhancement module, so that the risk is avoided that the data is maliciously intercepted or tampered in the data transmission process, and the conference client can convert the conference data in the ciphertext form into the conference data in the plaintext form according to the conference key, so that the conference content is shared.

Figure 4:
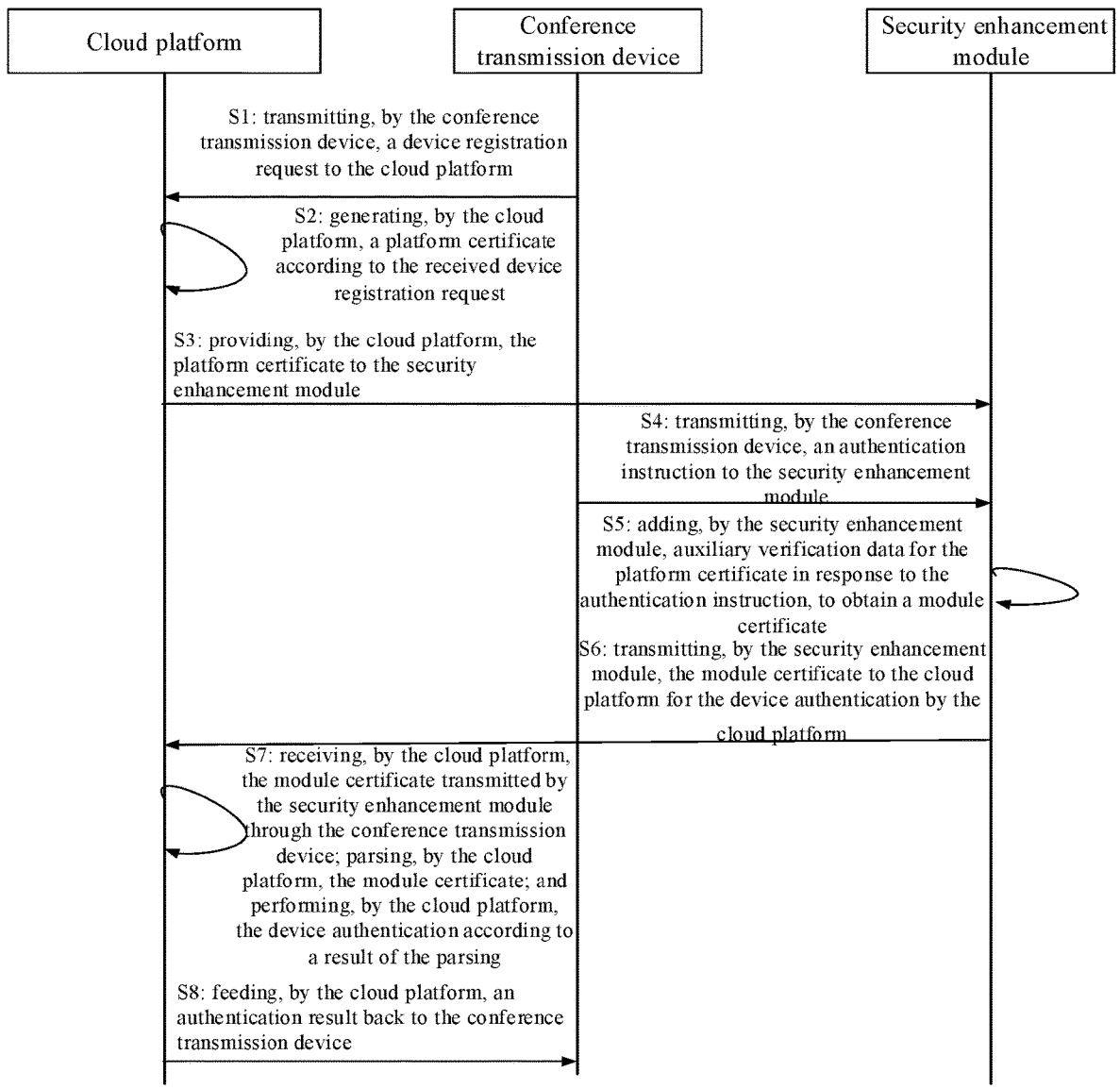
FIG. 4 is a flowchart of a device authentication process for a security enhancement module, a conference transmission device, and a cloud platform according to an embodiment of the present disclosure.

As shown in FIG. 4, the conference data transmission method according to the embodiment of the present disclosure is used to implement a data interaction among the cloud platform, the conference transmission device, the security enhancement module, and the conference client. FIG. 4 is intended to illustrate an authentication and interaction process among a plurality of devices.

The conference transmission device is used for achieving an acquisition of the conference data and the cloud uploading operation. The conference transmission device is typically located within a conference venue, to facilitate capturing the conference data, such as conference images, in real-time. The conference transmission device is an external device with respect to the cloud platform, and has numerous device models and various sources, comes from various types of sources, so that if a safety inspection is performed on conference transmission devices one by one, undoubtedly, it will consume a large amount of time costs, and easily cause the potential safety hazards due to problems, such as a missing inspection or the like. Therefore, in the application scenario of the embodiment, the conference transmission device has the characteristics of coming from a wide range of sources, difficulty in the safety inspection or the like. In order to implement security verification for the conference transmission device conveniently, quickly, safely and efficiently, in this embodiment, the security enhancement module is provided. The encryption process and the decryption process for the sensitive data are realized through the security enhancement module, so that the sensitive data is prevented from leaking, and the communication security is improved in the scene where the conference transmission device is unreliable.

The security enhancement module may communicate with the conference transmission device in various ways. For example, the security enhancement module may be connected to the conference transmission device by wire or wirelessly. In an optional implementation, in order to improve the flexibility of setting the security enhancement module, the security enhancement module is plugged and connected with the conference transmission device in a pluggable way, so as to implement the communication therebetween. For example, in one implementation, the security enhancement module may be connected to the conference transmission device via a USB interface, or via an internal data bus, such as PICE/LVDS/I2C/UART, or the like. For another example, in another implementation, the security enhancement module may be inserted into the conference transmission device as a security chip (FPGA), and thus, be connected to a system on chip (SOC) through an internal data bus, so as to implement the communication with the conference transmission device. In summary, the present disclosure does not limit a specific access form of the security enhancement module, as long as the security enhancement module may be flexibly and conveniently communicated with the conference transmission device.

Therefore, the security enhancement module may replace the conference transmission device to realize the encryption and decryption for the data, the data verification and the like, thereby improving the security. Optionally, in order to prevent an unreliable device from accessing the cloud platform, in this embodiment, prior to the conference data transmission, a device registration operation and a device authentication operation are performed firstly. In a case where the device authentication is passed, the identity of the participant is verified. In a case where the verification for the identity of the participant is passed, the conference data is transmitted. As shown in FIG. 4, the method includes:

I. The Device Registration

Step S1: transmitting, by the conference transmission device, a device registration request to the cloud platform.

The device registration request is used for registering relevant information of the conference transmission device on the cloud platform. In addition, in the device registration process, it is necessary for the cloud platform to record not only a device information of the conference transmission device, but also a module information of the security enhancement module associated with the conference transmission device. Correspondingly, in the subsequent device authentication process, a legality of the conference transmission device and a legality of the security enhancement module are verified so as to ensure the reliable access of the device.

In a first application scenario, the security enhancement module is pre-allocated to the conference transmission device, and correspondingly, the device registration request transmitted by the conference transmission device includes: the module information of the security enhancement module and the device information of the conference transmission device. The module information of the security enhancement module is used for uniquely identifying one security enhancement module, and may be, for example, an ID identification of the security enhancement module. The device information of the conference transmission device is used for describing device characteristics of the conference transmission device. For example, the device information includes: a device service type and/or a device authentication type. The device service type is used for describing service types of the conference transmission device (i.e., a conference type, such as an internal conference, an external conference, or the like). The device authentication type is used for describing an authentication way for the device, and may be specifically set by a security level of the device. In this way, the conference transmission device transmits the device registration request, so that the correspondence between the conference transmission device and the security enhancement module may be flexibly adjusted, which easily realize a flexible pairing between the security enhancement module and the conference transmission device with a higher flexibility.

In a second application scenario, the security enhancement module is not pre-allocated to the conference transmission device, and correspondingly, upon receiving the device registration request, the cloud platform allocates the corresponding security enhancement module to the conference transmission device. At this time, the device registration request transmitted by the conference transmission device includes the device information of the conference transmission device, but does not include the module information of the security enhancement module. In this way, the security enhancement module is allocated directly by the cloud platform, so that the correspondence between the security enhancement module and the conference transmission device is set by the cloud platform, and cannot be changed randomly in the later period, which has a higher security.

In practical situations, at least one of the two ways may be flexibly selected according to characteristics of a specific conference.

Step S2: generating, by the cloud platform, a platform certificate according to the received device registration request.

The cloud platform acquires the module information of the security enhancement module and the device information of the conference transmission device in the device registration request, and generates a platform certificate according to the module information of the security enhancement module and the device information of the conference transmission device. Optionally, when the platform certificate is generated according to the module information of the security enhancement module and the device information of the conference transmission device, the module information of the security enhancement module and the device information of the conference transmission device are further encrypted to obtain the platform certificate in a ciphertext form.

In the first application scenario, the cloud platform parses the device registration request, obtains the module information of the security enhancement module and the device information of the conference transmission device in the device registration request, performs an encryption operation on the module information of the security enhancement module and the device information of the conference transmission device through a platform certificate key (such as a key A), and obtains the platform certificate according to an encryption result. To improve an efficiency of performing the encryption, the encryption operation may be a symmetric encryption operation. For example, an AES encryption algorithm may be used. Therefore, a plaintext of the platform certificate includes the module information of the security enhancement module and the device information of the conference transmission device. The security in the transmission process can be improved through the encryption operation.

In the second application scenario, the cloud platform parses the device registration request, obtains the device information of the conference transmission device in the device registration request, and allocates a corresponding security enhancement module according to a type of the conference transmission device. An encryption operation is performed on the module information of the allocated security enhancement module and the device information of the conference transmission device through a platform certificate key (such as a key A), to obtain the platform certificate according to an encryption result. In this way, the security enhancement module is allocated by the cloud platform according to the device information in the device authentication request.

Optionally, when the conference transmission device includes various device types, different types of the security enhancement module may be provided for the various types of the conference transmission device. Correspondingly, the cloud platform selects a security enhancement module matching with a device type of a current device for allocation, according to the device information in the device authentication request.

Step S3: providing, by the cloud platform, the platform certificate to the security enhancement module.

In the step, the cloud platform may provide the platform certificate to the security enhancement module through the conference transmission device, or may directly provide the platform certificate to the security enhancement module. Accordingly, the security enhancement module receives and stores the platform certificate generated by the cloud platform in response to the device registration request. For example, in the above first application scenario, the cloud platform transmits the platform certificate to the conference transmission device, and the conference transmission device provides the platform certificate and a platform certificate key to the security enhancement module. In the above second application scenario, the cloud platform directly provides the platform certificate and the platform certificate key to the security enhancement module. In the above first application scenario, the platform certificate stored in the security enhancement module is dynamically added, so that different conference transmission devices can be dynamically adapted, and the flexibility is improved. In the above second application scenario, the platform certificate and the platform certificate key can be directly burned in the security enhancement module, so that the security is further improved.

In addition, no matter which way is adopted, the cloud platform needs to record the correspondence between the module information of the security enhancement module and the device information of the conference transmission device, so that the security is further improved in the subsequent authentication process by means of the correspondence, and potential safety hazards caused by malicious replacement of the conference transmission device or the security enhancement module are prevented.

II. The Device Authentication

Step S4: transmitting, by the conference transmission device, an authentication instruction to the security enhancement module.

The conference transmission device actively initiates a device authentication operation, so that the authentication instruction is transmitted to the security enhancement module.

Step S5: adding, by the security enhancement module, auxiliary verification data for the platform certificate in response to the authentication instruction, to obtain a module certificate.

The security enhancement module adds the auxiliary verification data for the stored platform certificate in response to the authentication instruction transmitted by the conference transmission device, to obtain the module certificate. The auxiliary verification data includes various additional data capable of realizing an auxiliary verification function, such as timestamp data, device fingerprint data or the like.

Optionally, in order to improve the security, the platform certificate generated by the cloud platform is a platform certificate in the ciphertext form. Firstly, the security enhancement module decrypts the platform certificate in the ciphertext form according to the platform certificate key (such as the key A) provided by the cloud platform, to obtain the platform certificate in a plaintext form. When the platform certificate is obtained in a symmetric encryption way, the platform certificate key for the decryption process is the same as that used in the encryption process performed by the cloud platform, so that the decryption process can be realized at a higher speed. Alternatively, in other application scenarios with a higher security, the encryption process and the decryption process may be realized in an asymmetric encryption-decryption way.

Then, the auxiliary verification data is added to the platform certificate in the plaintext form, to obtain the module certificate in the plaintext form. For example, the security enhancement module obtains an internal system time, generates timestamp data according to the internal system time, and adds the timestamp data to the platform certificate, to obtain the module certificate. This process is substantially equivalent to a certificate reorganization process, through which the security can be further increased by means of the auxiliary verification data. For example, if the timestamp data is tampered, it indicates that the certificate has been attacked during transmission.

Finally, the module certificate in the plaintext form is encrypted through a module certificate key, to obtain the module certificate in the ciphertext form. In an optional implementation, the platform certificate in the ciphertext form is obtained in a symmetric encryption way; the module certificate in the ciphertext form is obtained in an asymmetric encryption way; and the module certificate key is obtained from the cloud platform. The module certificate in the ciphertext form is obtained in the asymmetric encryption way, so that the transmission safety of the module certificate can be improved.

The module certificate key may be obtained in a variety of ways. For example, in one implementation, a communication request (also called a request for acquiring the module certificate key) is transmitted by the security enhancement module to the cloud platform through the conference transmission device. The cloud platform generates a module certificate private key stored in the cloud platform and a module certificate public key forwarded by the conference transmission device to the security enhancement module according to the received communication request. The module certificate public key is the module certificate key. Therefore, the asymmetric encryption and decryption are realized by the module certificate private key and the module certificate public key.

In addition, it should be noted that in this embodiment, the security enhancement module is connected to the conference transmission device through a preset interface in the pluggable way, and the security enhancement module communicates with the conference transmission device through a preset transmission protocol (i.e., a first transmission protocol) corresponding to the preset interface. The preset interface includes a USB interface, and the preset transmission protocol includes a USB protocol. In addition, the conference transmission device and the cloud platform communicate with each other through a platform transmission protocol (also known as a first communication protocol), such as a message queuing telemetry transport (MQTT) protocol. The MQTT protocol is an unencrypted protocol based on TCP, and is a message protocol based on a publishing/subscribing paradigm under an ISO standard (ISO/IEC PRF 20922), and operates in a TCP/IP protocol family, and is a publishing/subscribing message protocol designed for a remote device with a low hardware performance and designed in the case of a poor network condition. Therefore, the MQTT protocol is used as a message middleware through which the conference transmission device and the cloud platform communicate with each other. The MQTT protocol is a client-server based message publishing/subscribing transport protocol. The MQTT protocol is lightweight, simple, open, and is easily implemented, so that the MQTT protocol has a very wide application range. In many cases (including in restricted environments, such as a machine to machine (M2M) communication and an internet of things (IoT)), the MQTT protocol has been widely used in a sensor for communicating with other sensors via a satellite link, a medical device occasionally dialed, a smart home, and some miniaturized devices.

Correspondingly, the conference transmission device needs to perform a protocol conversion operation. After the protocol conversion is performed on the data received from the security enhancement module through the second transmission protocol, the data is transmitted to the cloud platform through a first transmission protocol. After the protocol conversion is performed on the data received from the cloud platform through the first transmission protocol, the data is transmitted to the security enhancement module through the second transmission protocol. Therefore, in this step, the conference transmission device needs to perform a protocol conversion on a communication request from the security enhancement module, so that the communication request is converted from the USB protocol to the MQTT protocol, and then transmitted to the cloud platform. After receiving the module certificate public key transmitted by the cloud platform through the MQTT protocol, the protocol conversion is performed on the module certificate public key, and the converted module certificate public key is transmitted to the security enhancement module through the USB protocol.

Step S6: transmitting, by the security enhancement module, the module certificate to the cloud platform for the device authentication by the cloud platform.

The security enhancement module transmits the module certificate to the conference transmission device, and then, the conference transmission device transmits the module certificate to the cloud platform for the device authentication. Correspondingly, the conference transmission device transmits the module certificate received from the security enhancement module to the cloud platform for the device authentication by the cloud platform.

In one implementation, the security enhancement module transmits the module certificate in the ciphertext form to the conference transmission device through the USB protocol, and the conference transmission device transmits the module certificate in the ciphertext form to the cloud platform through the MQTT protocol.

Step S7: receiving, by the cloud platform, the module certificate transmitted by the security enhancement module through the conference transmission device; parsing, by the cloud platform, the module certificate; and performing, by the cloud platform, the device authentication according to a result of the parsing.

Optionally, when the module certificate is in the ciphertext form, the cloud platform decrypts the received module certificate in the ciphertext form, to obtain the module certificate in the plaintext form; matches the module certificate in the plaintext form with a platform certificate generated in advance. If the module certificate in the plaintext form successfully matches with the platform certificate generated in advance, the device authentication is successful. The module certificate in the ciphertext form may be asymmetrically decrypted by the above module certificate private key.

The module certificate in the plaintext form includes: the auxiliary verification data and the platform certificate in the plaintext form obtained through the parsing by the security enhancement module. Generally, the module information of the security enhancement module and the device information of the conference transmission device, which are contained in the platform certificate in the plaintext form obtained through the parsing by the security enhancement module, are consistent with the relevant information in the platform certificate generated in advance by the cloud platform. Therefore, if the module certificate in the plaintext form successfully matches with the platform certificate generated in advance, the device authentication is successful; and if the module certificate in the plaintext form does not successfully match with the platform certificate generated in advance, the device authentication fails.

In one example, a cloud effectively extracts information of a decrypted module certificate plaintext, for example, extracts an ID identifier inside the security enhancement module. That is, a unique ID inside the security enhancement module is used as a unique reliable root of the conference transmission device on the cloud platform. Correspondingly, the cloud platform compares the unique ID inside the security enhancement module extracted by the platform with a reliable root stored in the cloud in a comparison process. If the comparison is successful, the authentication is successful, and otherwise, the authentication fails. The cloud platform transmits the authentication result in the plaintext form to the conference transmission device through the MQTT protocol, and the conference transmission device transmits the authentication result to the security enhancement module through the USB protocol. In this example, the cloud platform only compares the module information of the security enhancement module. The authentication is successful as long as the module information of the security enhancement module is successfully matched.

In order to improve the security, in other examples, the cloud platform not only performs a comparison on the module information of the security enhancement module but also performs a comparison on the device information of the conference transmission device. Only when a combination relationship between the module information of the security enhancement module and the device information of the conference transmission device is consistent with that pre-stored in the cloud platform, the authentication is successful. In this way, the authentication is performed through the combination relationship between the module information of the security enhancement module and the device information of the conference transmission device. If any of the conference transmission device or the security enhancement module is changed, the authentication fails, so that the security is improved.

Step S8: feeding, by the cloud platform, an authentication result back to the conference transmission device.

III. The Identity Verification

The device registration process and the device authentication process are mainly used to verify the validity of the conference transmission device and the security enhancement module. In other embodiments, the device registration process and the device authentication process may be omitted. For example, when the conference transmission device is frequently used, the device registration process and the device authentication process may be omitted, and the method is performed from the identity verification process.

Figure 5:
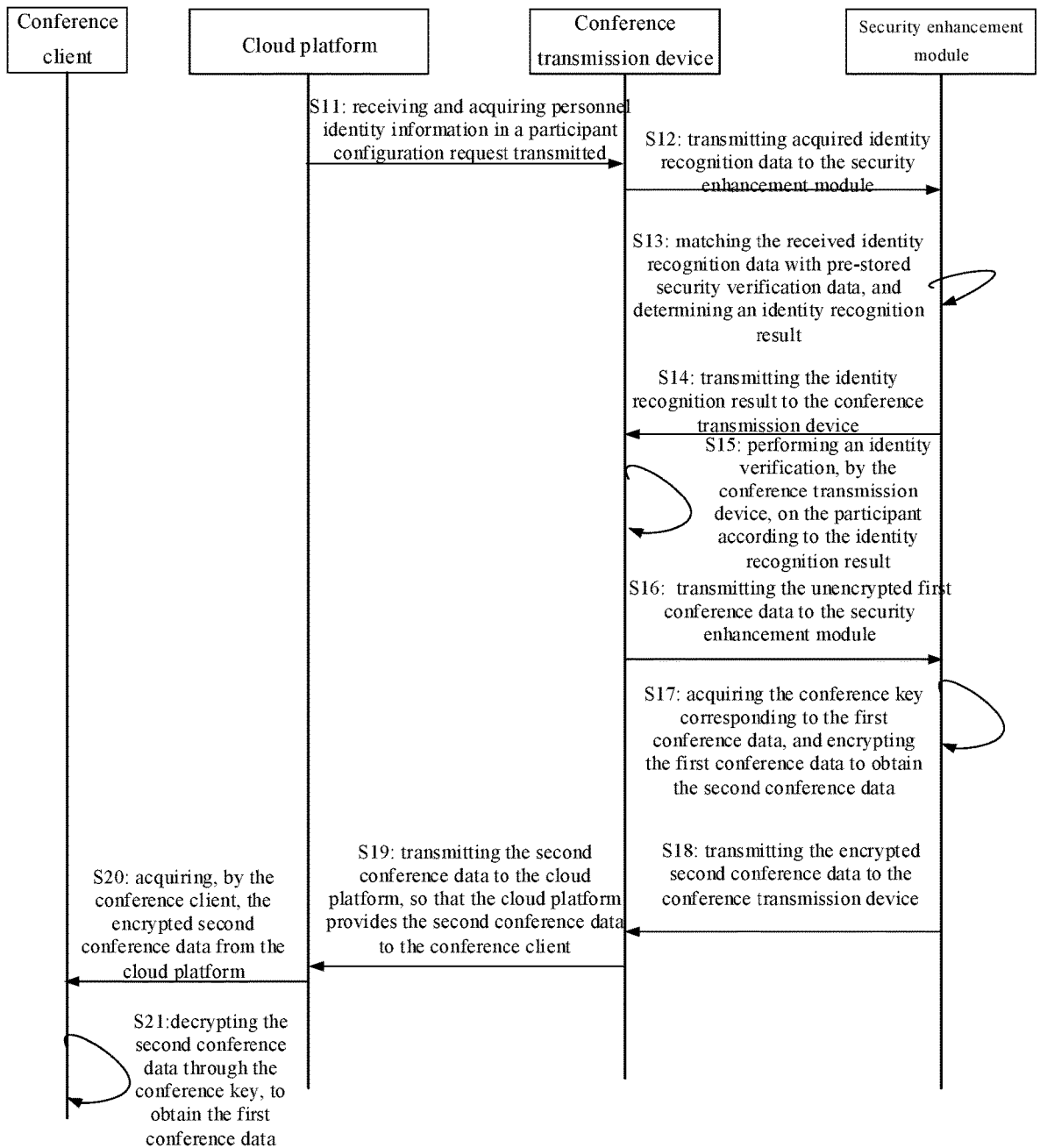
FIG. 5 shows a detailed flow diagram of an identity verification and conference data transmission process.

The identity verification process is intended to verify whether the identity of the participant is legal or not, so as to prevent the irrelevant personnel from participating in the conference. FIG. 5 shows a detailed flow diagram of an identity verification and conference data transmission process. As shown in FIG. 5, the identity verification and conference data transmission process specifically includes:

Step S11: receiving and acquiring, by the conference transmission device, personnel identity information in a participant configuration request transmitted by the cloud platform.

The cloud platform transmits the participant configuration request to the data transmission device in response to an input operation of a conference configuration personnel, wherein the participant configuration request includes the personnel identity information and indicates identity identification of the participant. The conference transmission device saves the personnel identity information for subsequent verification.

For example, the cloud platform creates a conference, sets an identity authority of the participant, and transmits an ID of the participant to the conference transmission device through an MQTT protocol, so that the conference transmission device stores the ID of the participant locally.

Step S12: transmitting, by the conference transmission device, acquired identity recognition data to the security enhancement module.

The identity recognition data is used to identify the identity of the participant. The identity recognition data transmitted by the conference transmission device includes: device collection data for identifying the identity of the participant. The device collection data includes at least one of: face image data, iris image data, fingerprint data, and password data.

The conference transmission device may include various acquisition modules, such as a camera module, an iris acquisition module, a fingerprint input module, and a password input module. Correspondingly, by means of the various acquisition modules, the identity recognition data in various forms can be acquired in a flexible way. In addition, in a remote conference scene, the identification data may also be face image data uploaded by each conference client, so as to verify the identity of the participant corresponding to each conference client.

For example, the information of the participant is acquired through a camera acquisition and a feature extraction, and is transmitted to the conference transmission device; and the conference transmission device extracts face feature information and transmits the face feature information as the identity recognition data to the security enhancement module.

Step S13: matching, by the security enhancement module, the received identity recognition data with security verification data pre-stored in the security enhancement module, and determining an identity recognition result corresponding to the identity recognition data according to a matching result.

The security verification data pre-stored in the security enhancement module refers to: user personal data related to personnel identity verification, such as face features, iris features of employees in a company or the like. For example, the security verification data includes: feature data and identification information of a registered member. In this embodiment, in order to improve the security of the personal data of the user, the personal data of the user is stored in the security enhancement module, and the external device cannot access the security verification data stored in the security enhancement module, so as to improve the information security. As can be seen, in this embodiment, the identity recognition result corresponding to the identity recognition data includes: identification information of the participant; wherein the device collection data includes at least one of: the face image data, the iris image data, the fingerprint data, and the password data; the identification information includes: a name, a unique identifier, brief information.

Optionally, before receiving the identity recognition data transmitted by the conference transmission device, the security enhancement module further receives and stores the security verification data from an upper computer. The security verification data from the upper computer is in the ciphertext form. Correspondingly, when the identity recognition data is matched with the security verification data pre-stored in the security enhancement module, the security verification data in the ciphertext form is decrypted through a verification key, to obtain the security verification data in the plaintext form; and the identity recognition data is matched with the security verification data in a plaintext form. The verification key and a decryption algorithm may be obtained by negotiating with the upper computer. In a word, the security verification data stored in the security enhancement module is in the ciphertext form, so that even if the security enhancement module is maliciously cracked, the security verification data cannot be leaked.

When the identity recognition data is matched with the security verification data pre-stored in the security enhancement module, the method may be realized in the following way:

Firstly, the security enhancement module decrypts the ciphertext of the security verification data through a symmetric decryption algorithm and the verification key, to obtain a plaintext of a face feature library (i.e., feature data of the registered member) and a form (i.e., identification information of the registered member stored through a data table) in the security verification data. The security enhancement module compares the identity recognition data transmitted by the conference transmission device with the face feature library (i.e., feature data of the registered member) one by one, records a sequence number with a maximum comparison result (i.e., the number of the face feature with the highest similarity), inquires an ID number from the plaintext of the form through a corresponding sequence number, and transmits the ID number as the identity recognition result to a device side. In one implementation, the face feature library is a 20 thousand base library, that is, 20 thousand sets of face feature information are stored in the face feature library, and each set of face feature information includes 512 floating-point numbers. The form is an ID number corresponding to information of the feature library.

Step S14: transmitting, by the security enhancement module, the identity recognition result to the conference transmission device.

Step S15: performing identity verification, by the conference transmission device, on the participant according to the identity recognition result.

The conference transmission device receives the identity recognition result returned by the security enhancement module after matching the identity recognition data with the pre-stored security verification data, matches the identity recognition result with the personnel identity information in the participant configuration request received from the cloud platform, and verifies the identity of the participant according to a matching result. For example, the conference transmission device compares an ID (i.e., the personnel identity information) issued by the cloud platform with an ID transmitted by the security enhancement module (i.e., an ID number inquired from the plaintext of the form). If they are completely matched with each other, the conference is normally started; if they are not matched with each other, it is notified that a personnel without authority participates in the conference.

Step S16: in a case where the identity verification of the participant is passed, transmitting, by the conference transmission device, the unencrypted first conference data to the security enhancement module.

The conference transmission device generates the first conference data according to the conference content (including note information or the like), and transmits the unencrypted first conference data to the security enhancement module.

Step S17: acquiring, by the security enhancement module, the conference key corresponding to the first conference data, and encrypting the first conference data through the conference key, to obtain the encrypted second conference data.

The security enhancement module is configured to encrypt the first conference data, wherein the conference key may be generated in various ways:

In one implementation, the conference key is generated by the security enhancement module. In order to improve the security, the conference key is encrypted twice: firstly, the conference key corresponding to the first conference data is generated, and the first conference data is encrypted through the conference key. The conference key may be calculated by the security enhancement module according to the module information (for example, the security enhancement module derives a conference key B according to an internal unique identification number, which is also called a device DNA). Alternatively, the conference key is determined by the security enhancement module according to a data type of the first conference data. For example, different conference keys are set for different types and different security levels of the conference data, respectively. Then, the conference key is encrypted through the security key provided by the cloud platform, to obtain a cipher key, so as to obtain the second conference data according to the encrypted first conference data and the cipher key. Therefore, the second conference data includes: the first conference data encrypted through the conference key and the cipher key (i.e. a result of encrypting the conference key through the security key). For example, the security enhancement module encrypts the conference content in the symmetric encryption way and through the conference key B, to obtain a ciphertext of the conference content, and transmits the ciphertext of the conference content to the cloud platform through the conference transmission device. The conference key B is encrypted in the symmetric encryption way and through a key C (the security key), to obtain a ciphertext of the key B, which is transmitted to the cloud platform through the conference transmission device. Correspondingly, the cloud platform stores the second conference data.

The secure key provided by the cloud platform may be generated through a symmetric encryption algorithm or an asymmetric encryption algorithm. The secure key may be a fixed key or a variable key. The variable key may be dynamically changed, and therefore, is suitable for a scene with a higher security. The security key may further be used for performing a secondary encryption to avoid the problem that the transmission for the plaintext is easily attacked.

Optionally, the security key is dynamically obtained in a key negotiation way: the conference transmission device transmits a key negotiation request to the cloud platform; provides the security key from the cloud platform to the security enhancement module according to a result returned by the cloud platform; wherein the security key is generated according to the device service type and/or the device authentication type of the conference transmission device. When the security key from the cloud platform is provided to the security enhancement module, a first key obtained after the security key is encrypted by the cloud platform through the platform private key is transmitted to the security enhancement module, so that the security enhancement module decrypts the first key through the pre-acquired platform public key, to obtain the security key. Correspondingly, the security enhancement module receives the security key returned by the cloud platform in response to the key negotiation request transmitted by the conference transmission device. For example, the security enhancement module receives the first key obtained by encrypting the security key through the platform private key by the cloud platform; and decrypts the first key through the pre-acquired platform public key, to obtain the security key. In summary, the frequency of obtaining the security key and the specific encryption way are not limited in the present disclosure.

In other implementations, alternatively, the conference key may be obtained directly through the key negotiation request. The conference key may be used for the symmetric encryption or the asymmetric encryption.

Step S18: transmitting, by the security enhancement module, the encrypted second conference data to the conference transmission device.

Step S19: transmitting, by the conference transmission device, the encrypted second conference data to the cloud platform, so that the cloud platform provides the second conference data to the conference client.

Step S20: acquiring, by the conference client, the encrypted second conference data from the conference transmission device from the cloud platform.

The second conference data is obtained by encrypting the first conference data provided by the conference transmission device through the conference key by the security enhancement module. The conference client may obtain the second conference data through a conference download entry (such as a hyperlink, a download button, and a shared two-dimensional code) provided by the cloud platform, which is not limited in the present invention.

Step S21: acquiring, by the conference client, the conference key, and decrypting the second conference data through the conference key, to obtain the unencrypted first conference data.

The conference client acquires the cipher key in the second conference data; the cipher key is obtained by encrypting the conference key through the security key provided by the cloud platform. Correspondingly, the conference client decrypts the cipher key through the security key provided by the cloud platform, to obtain the conference key. The method of acquiring the security key may refer to that at a conference transmission device side, which is not described herein again.

For example, the conference client downloads a ciphertext of the conference information and a ciphertext of the key B from the cloud platform, and decrypts the ciphertext of the key B in the symmetric decryption way and a built-in key C (i.e., the secure key), to obtain a plaintext of the key B. A ciphertext of the conference content is decrypted in the symmetric decryption way and through the key B, to obtain a plaintext of the conference content.

In summary, the present disclosure provides a security conference management system based on the security enhancement module. The security enhancement module is added, the sensitive data is stored and safely calculated inside the security enhancement module, a calculation result of the device is fed back, so that the risk of the sensitive data leaking is effectively reduced. The key is managed in the security enhancement module, and the security level of the key is enhanced. The conference content is transmitted in the ciphertext form on the cloud and off the cloud in a full link, and the key is privately shared between the device side and the client side, so that the security of the conference content at a public cloud is protected. The security conference management system includes the conference client, the cloud, the device side (i.e., the conference transmission device) and the security enhancement module side. The conference client may be designed based on an operating system such as Android or Linux or the like, and an environment of an operating system is not limited in the present disclosure. The cloud includes a public cloud, a private cloud and a privatized deployment for the public cloud, and an environment of a cloud deployment is not limited in the present disclosure. The conference transmission device in this embodiment refers to a conference all-in-one machine, and the security enhancement module may be connected to the conference transmission device in various forms such as a USB form or a security chip or the like.

In this embodiment, the cloud platform is configured to: create a security conference, manage a security authority, store the conference content in the ciphertext form, store the key B in the ciphertext form and the like. The conference transmission device is used for: the camera acquisition, the feature extraction and the like. The security enhancement module is used for: sensitive data storage, secure computation and data encryption. The conference client is configured to: acquire the conference content in the ciphertext form, decrypt the key in the ciphertext form and decrypt the conference content in the ciphertext form. The sensitive data are encrypted and stored in the security enhancement module, and includes: a face feature library, a fingerprint library, a digital certificate, a key, a form and the like. In the embodiment, the sensitive data refers to the face feature library and the form. The face feature library refers to face information of employees in an organization or a company. The form refers to physical information corresponding to the feature information, such as an ID number, a name, an age or the like. In the embodiment, the camera mainly collects images of the participants, transmits the information to the device side; face features are extracted by the device side, and is transmitted to the security enhancement module for comparison of the face features; and ID information corresponding to the form is transmitted to the device side according to a comparison result. The security enhancement module has at least the following characteristics: the sensitive data is stored in the ciphertext form inside the security enhancement module. The sensitive data is encrypted in the symmetric encryption way through a customized upper computer software and then stored in the security enhancement module. The sensitive data can only be written in the security enhancement module and cannot be read out from the security enhancement module. The conference content is transmitted in the ciphertext form in the full link, which is completed in the client, the cloud, the device side and the security enhancement module side together. The ciphertext storage is completed in the cloud; the generation for the shared two-dimensional code is completed in the device side; the encryption and decryption for the content is completed in the security enhancement module side; and the downloading and decryption for the conference content is completed in the client.

In addition, the security key in this embodiment may be flexibly set according to the authentication type of the conference transmission device: the security key corresponds to the device identification when the device authentication type is a first authentication type (e.g., a one-machine-one-key type). In the first authentication type, one key is generated for each device. The device is unique, so that the security is higher. The security key corresponds to a device model when the device authentication type is a second authentication type (e.g., a one-type-one-key type). In the second authentication type, one key is generated for each device model. The same model may contain a plurality of devices, so that the security of the security key in the second authentication type is slightly lower than that of the security key in the first authentication type. The security key corresponds to a device service type when the device authentication type is a third authentication type (e.g., a uniform key). In the third authentication type, a uniform security key is generated for all devices, and thus, has a lowest security. For example, a same security key may be generated for conference transmission devices of the same service type.

In addition, in this embodiment, the conference transmission device communicates with the cloud platform through a first communication protocol, and communicates with the security enhancement module through a second communication protocol; wherein the first communication protocol includes: an MQTT protocol; and the second communication protocol includes: a USB protocol. Accordingly, the conference transmission device needs to perform a corresponding protocol conversion process according to the data type. In this embodiment, the transmission protocol between the conference transmission device and the cloud platform is different from that between the conference transmission device and the security enhancement module, so that the conference transmission device needs to perform the protocol conversion processing on the data to be received or to be transmitted. In addition, different transmission protocols are adopted among different devices, so that network attacks among the devices can be avoided, and the security is improved.

In addition, the security enhancement module communicates with the conference transmission device through a preset application interface; wherein the preset application interface is provided by a software development kit corresponding to the security enhancement module.

Therefore, the security enhancement module is added to the device side, and the device authentication and the security data interaction way of the security enhancement module, the device side and the platform side are established, so that the security of the device side is protected to the maximum extent. The security enhancement module performs the data interaction with the device side through the USB interface so as to be compatible with the existing devices. In addition, a security data interactive mechanism among the security enhancement module, the device side and the cloud platform is constructed through the security enhancement module and a security SDK on the device side. The security enhancement module has at least following characteristics: Sensitive data, such as the key or the certificate or the like, is reliably stored, and cannot be transmitted to the outside through the USB interface. Moreover, the sensitive data is stored inside the security enhancement module in the encryption way. Even if the security enhancement module is cracked, plaintext information of the encrypted data stored inside the security enhancement module cannot be directly obtained. For example, the security key stored inside the security enhancement module is stored in the ciphertext form through a secondary encryption process. In addition, the sensitive data stored inside the security enhancement module is not transmitted to the outside. The sensitive data, such as the certificate or the like, may be written in through a customized upper computer software and may be written in and not be read out. Moreover, the encryption process and the decryption process are both completed inside the security enhancement module, so that the defect of vulnerability caused by the encryption process and the decryption process in external devices is overcome. The security enhancement module may dynamically perform the key negotiation operation with the cloud platform through the conference transmission device, and a frequency of the key negotiation may be flexibly adjusted according to the device type and the authentication way. In addition, the security key obtained through the key negotiation may be generated in different ways by combining the device type and the authentication way, so that the way of generating the security key can be conveniently determined according to a data security level, thereby further improving the security. The keys in the authentication process and in the data transmission process may be flexibly set according to the data type. For example, the cloud platform dynamically determines a key matching the data type according to the data type to be transmitted. That is, the type of the key and the encryption and decryption way may be flexibly set according to the data type and the interaction process. For example, different encryption/decryption ways may be selected for different interaction processes. For example, a symmetric key is used for the platform certificate; and an asymmetric key is used for the module certificate, so as to set the key and the encryption and decryption way according to the interaction process and the data security level. In addition, in an application scenario of the present disclosure, the security enhancement module is provided by the cloud platform of the internet of things, and thus belongs to a reliable device, whereas the conference transmission device is an external device independent of the cloud platform, and thus belongs to an unreliable device. In order to avoid security problems caused by the attack for the unreliable device, the encryption process and the decryption process for the sensitive data are both implemented by the security enhancement module. Moreover, in order to further improve the security, a software development kit (SDK) is provided for the security enhancement module. Correspondingly, the conference transmission device may communicate with the security enhancement module and the cloud platform only by integrating the SDK. That is, a data transmission is carried out between the security enhancement module and the conference transmission device through a preset application interface. The application interface is provided by a software development kit corresponding to the security enhancement module. Therefore, in the embodiment, when data is transmitted between the conference transmission device and the security enhancement module, it is required to call a function of the application interface API provided by the SDK to achieve the data transmission. For example, when the conference transmission device transmits data to the security enhancement module, it is required to call a transmitting application interface matching with the type of the transmitted data; when the conference transmission device receives the data returned by the security enhancement module, it is required to call a receiving application interface matching the type of the received data. Because parameters and execution logic of application interface functions contained in the SDK are predefined, the execution logic related to the access of the sensitive data can be prevented from being written into the interface function in the process of setting the SDK, and the problem that the sensitive data is maliciously accessed is avoided.

Figure 6:
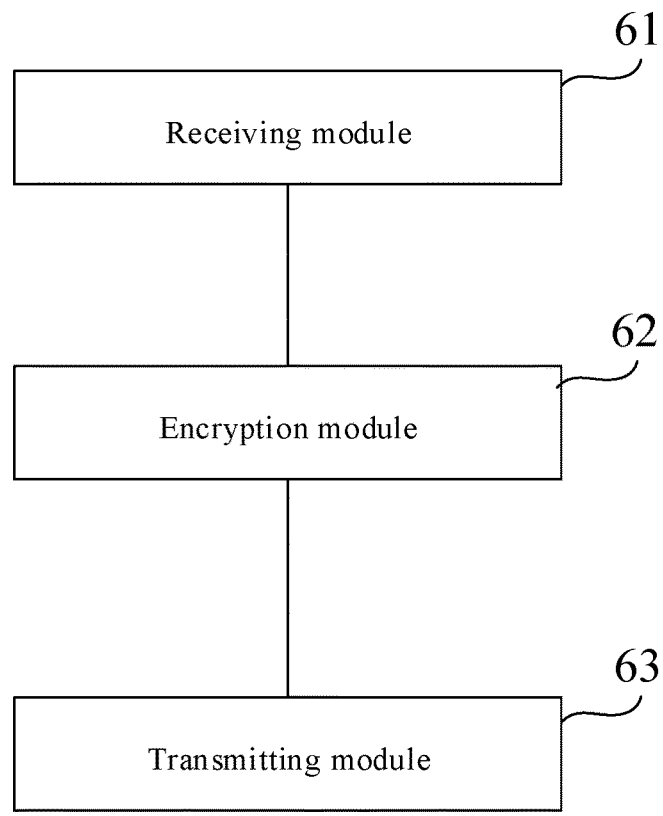
FIG. 6 is a block diagram of a conference transmission apparatus according to an embodiment of the present disclosure.

The embodiment of the present disclosure further provides a conference transmission apparatus, which may be the above security enhancement module. As shown in FIG. 6, the conference transmission apparatus according to an embodiment of the present disclosure includes: a receiving module 61 configured to receive unencrypted first conference data transmitted by the conference transmission device in a case where the identity verification of the participant is passed; an encryption module 62 configured to acquire a conference key corresponding to the first conference data, and encrypt the first conference data through the conference key, to obtain encrypted second conference data; and a transmitting module 63 configured to transmit the encrypted second conference data to the conference transmission device, so that the conference transmission device provides the encrypted second conference data to a conference client through the cloud platform.

In an optional implementation, the encryption module is specifically configured to: generate the conference key corresponding to the first conference data, and encrypt the first conference data through the conference key; encrypt the conference key through a security key provided by the cloud platform, to obtain a cipher key; obtain the second conference data according to the encrypted first conference data and the cipher key.

In an optional implementation, the conference key is calculated by the security enhancement module according to the module information; or the conference key is determined by the security enhancement module according to the data type of the first conference data.

In an optional implementation, the encryption module is specifically configured to: receive the security key returned by the cloud platform in response to the key negotiation request transmitted by the conference transmission device; wherein the security key is generated according to the device service type and/or the device authentication type of the conference transmission device.

In an optional implementation, the encryption module is specifically configured to: receive a first key obtained after the cloud platform encrypts the security key through a platform private key; and decrypt the first key through a pre-acquired platform public key, to obtain the security key.

In an optional implementation, the apparatus further includes: an identity verification module configured to receive identity recognition data transmitted by the conference transmission device; match the identity recognition data with security verification data pre-stored in the security enhancement module, and determine an identity recognition result corresponding to the identity recognition data according to a matching result; and transmit the identity recognition result to the conference transmission device, so that the conference transmission device performs an identity verification on the participant according to the identity recognition result.

In an optional implementation, the apparatus further includes: a storage module configured to receive and store the security verification data from an upper computer; wherein the security verification data from the upper computer is in a ciphertext form.

In an optional implementation, the identity recognition data transmitted by the conference transmission device includes: device collection data for identifying the identity of the participant.

The security verification data includes: feature data and identification information of a registered member.

The identity recognition result corresponding to the identity recognition data includes: the identification information of the participant; wherein the device collection data includes at least one of: face image data, iris image data, fingerprint data, and password data; the identification information includes: a name, a unique identifier, a profile information.

In an optional implementation, the apparatus further includes: a device authentication module configured to receive and store a platform certificate generated by the cloud platform in response to a device registration request; add auxiliary verification data for the platform certificate in response to an authentication instruction transmitted by the conference transmission device, to obtain a module certificate; and transmit the module certificate to the conference transmission device, so that the conference transmission device provides the module certificate to the cloud platform for a device authentication; wherein the identity verification of the participant is performed in case where the device authentication is passed.

Figure 7:
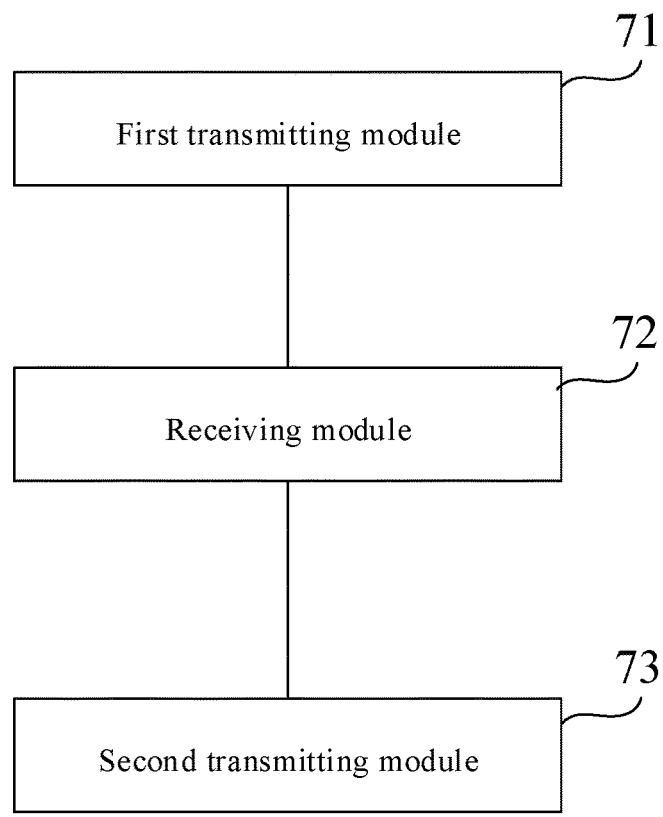
FIG. 7 is a block diagram of a conference transmission apparatus according to another embodiment of the present disclosure.

The embodiment of the present disclosure further provides a conference transmission apparatus, which may be the above conference transmission device. As shown in FIG. 7, the conference transmission apparatus provided in an embodiment of the present disclosure includes: a first transmitting module 71 configured to transmit unencrypted first conference data to a security enhancement module in a case where an identity verification of a participant is passed; a receiving module 72 configured to receive encrypted second conference data obtained by encrypting the first conference data by the security enhancement module through an acquired conference key; and a second transmitting module 73 configured to transmit the encrypted second conference data to the cloud platform, so that the cloud platform provides the second conference data to a conference client.

In an optional implementation, the conference key is generated by the security enhancement module, and the second conference data further includes: a cipher key obtained by encrypting the conference key through a security key provided by the cloud platform.

In an optional implementation, the apparatus further includes: a key negotiation module configured to transmit a key negotiation request to the cloud platform; provide the security key from the cloud platform to the security enhancement module according to a result returned by the cloud platform; wherein the security key is generated according to the device service type and/or the device authentication type of the conference transmission device.

In an optional implementation, the key negotiation module is specifically configured to: transmit a first key obtained after the cloud platform encrypts the security key through a platform private key to the security enhancement module, so that the security enhancement module decrypts the first key through the pre-acquired platform public key, to obtain the security key.

In an optional implementation, the apparatus further includes: an identity verification module configured to transmit acquired identity recognition data to the security enhancement module; receive an identity recognition result returned by the security enhancement module after matching the identity recognition data with pre-stored security verification data; and match the identity recognition result with personnel identity information in a participant configuration request received from the cloud platform, and verify the identity of the participant according to a matching result.

In an optional implementation, the apparatus further includes: a registration and authentication module configured to transmit a device registration request to the cloud platform, so that the security enhancement module receives and stores a platform certificate generated by the cloud platform in response to the device registration request; transmit an authentication instruction to the security enhancement module, so that the security enhancement module adds auxiliary verification data for the platform certificate, to obtain a module certificate; and transmit the received module certificate from the security enhancement module to the cloud platform, so that the cloud platform performs the device authentication.

Figure 8:
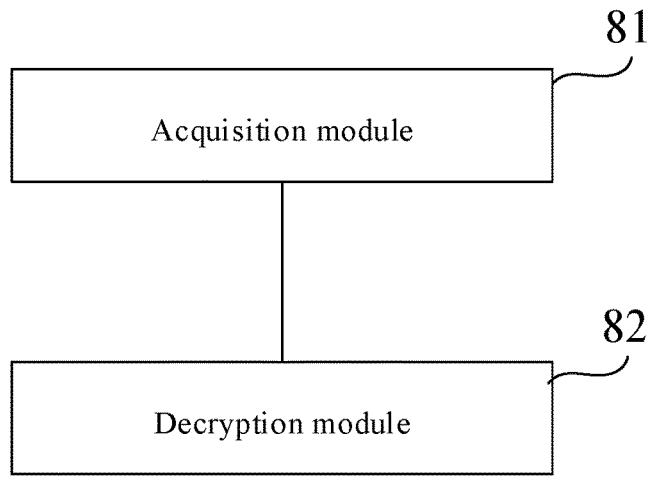
FIG. 8 is a block diagram of a conference client according to an embodiment of the present disclosure.

The embodiment of the present disclosure also provides a conference client. As shown in FIG. 8, the conference client provided by an embodiment of the present disclosure includes: an acquisition module 81 configured to acquire, from a cloud platform, encrypted second conference data from a conference transmission device; wherein the second conference data is obtained by encrypting first conference data provided by the conference transmission device through a conference key by the security enhancement module; and a decryption module 82 configured to obtain the conference key, and decrypt the second conference data through the conference key, to obtain unencrypted first conference data.

In an optional implementation, the acquisition module is specifically configured to: acquire a cipher key in the second conference data; wherein the cipher key is obtained by encrypting the conference key through the security key provided by the cloud platform; decrypt the cipher key through the security key provided by the cloud platform, to obtain the conference key.

Figure 9:
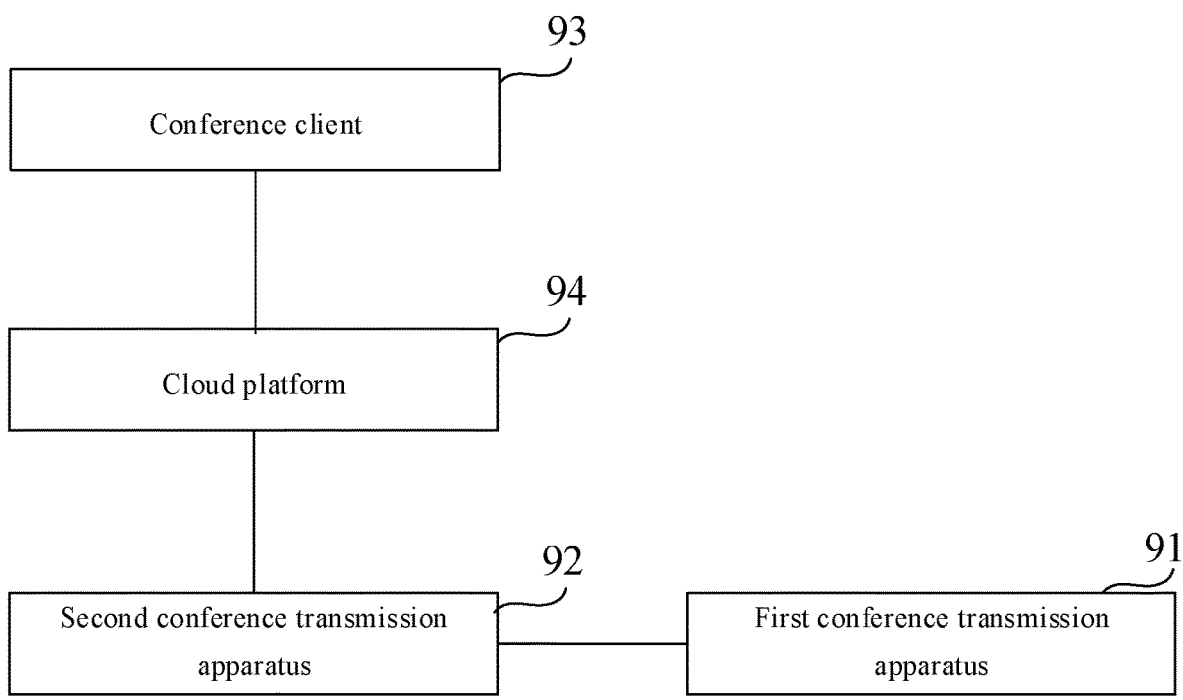
FIG. 9 is a block diagram of a conference transmission system according to an embodiment of the present disclosure.

The embodiment of the present disclosure also provides a conference transmission system. As shown in FIG. 9, the conference transmission system provided by the embodiment of the present disclosure includes: a first conference transmission apparatus 91, a second conference transmission apparatus 92, a conference client 93, and a cloud platform 94.

The first conference transmission apparatus 91 may be the security enhancement module shown in FIG. 6, the second data transmission apparatus 92 may be the conference transmission device shown in FIG. 7, and a structure of the conference client 93 may be shown in FIG. 8.

Figure 10:
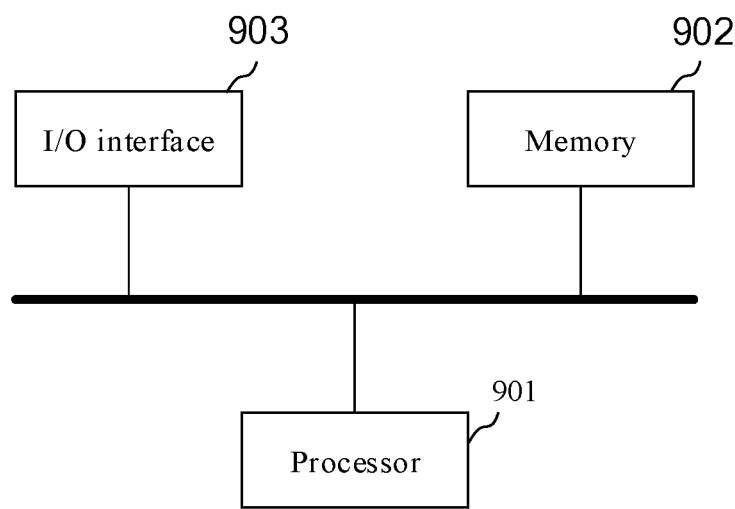
FIG. 10 is a functional block diagram of an electronic device according to an embodiment of the present disclosure.

Referring to FIG. 10, an embodiment of the present disclosure provides an electronic device, including: one or more processors 901; a memory 902 having one or more programs stored thereon that, when executed by the one or more processors, cause the one or more processors to implement the conference data transmission method of any one of the above embodiments; and one or more I/O interfaces 903 connected between the one or more processors and the memory and configured to enable information interaction between the one or more processors and the memory.

Each processor 901 is a device with a data processing capability, and includes, but is not limited to, a central processing unit (CPU), or the like; the memory 902 is a device with a data storage capability and includes, but is not limited to, a random access memory (RAM, more specifically, SDRAM, DDR, or the like), a read only memory (ROM), an electrically erasable programmable read only memory (EEPROM), a flash; the one or more I/O interfaces (read/write interfaces) 903 are connected between the one or more processors 901 and the memory 902, and may implement the information interaction between the one or more processors 901 and the memory 902, and may include, but not limited to, a data bus or the like.

In some embodiments, the one or more processors 901, the memory 902, and the one or more I/O interfaces 903 are connected to each other through the bus and further connected to other components of a computing device.

The present embodiment further provides a computer readable medium having stored thereon a computer program which, when executed by a processor, implements the conference data transmission method of any one of the above embodiments. Specific steps of the conference data transmission method are not described herein again, to avoid repeated descriptions.

It will be understood by one of ordinary skill in the art that all or some of the steps in the above disclosed method, functional modules/units in the system and the apparatus may be implemented as software, firmware, hardware, or suitable combinations thereof. In a hardware implementation, a division between functional modules/units referred to in the above description does not necessarily correspond to a division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable medium, including computer storage medium (or a non-transitory medium) and a communication medium (or a transitory medium). The computer storage medium includes volatile and nonvolatile, removable and non-removable medium implemented in any method or technology for storage of information such as computer-readable instructions, data structures, program modules or other data, as is well known to one of ordinary skill in the art. The computer storage medium include, but are not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which may be used to store the desired information and which may be accessed by a computer. In addition, the communication medium typically include computer readable instructions, data structures, program modules or other data in a modulated data signal such as a carrier wave or other transport mechanism, and may include any information delivery medium, as is well known to one of ordinary skill in the art.

It should be noted that the terms "including", "comprising", or any other variation thereof herein are intended to cover a non-exclusive inclusion, such that a process, method, article, or apparatus that includes a list of elements does not include only those elements but may include other elements not expressly listed or inherent to such process, method, article, or apparatus. Without further limitation, an element recited by a phrase "including an . . . " does not exclude the presence of other identical elements in the process, method, article, or apparatus that includes the element.

It should be understood that the above embodiments are merely exemplary embodiments adopted to explain the principles of the present disclosure or the utility model, and the present disclosure or the utility model is not limited thereto. It will be apparent to one of ordinary skill in the art that various changes and modifications may be made therein without departing from the spirit and scope of the present disclosure or the utility model, and such changes and modifications also fall within the scope of the present disclosure or the utility model.

What is claimed is:

1. A conference data transmission method for a security enhancement module, comprising:
   receiving unencrypted first conference data transmitted by a conference transmission device in a case where an identity verification of a participant is passed;
   acquiring a conference key corresponding to the first conference data, and encrypting the first conference data through the conference key, to obtain encrypted second conference data; and
   transmitting the encrypted second conference data to the conference transmission device, so that the conference transmission device provides the encrypted second conference data to a conference client through a cloud platform;
   wherein the acquiring the conference key corresponding to the first conference data, and encrypting the first conference data through the conference key, to obtain encrypted second conference data, comprises:
   generating the conference key corresponding to the first conference data, and encrypting the first conference data through the conference key;
   encrypting the conference key through a security key provided by the cloud platform, to obtain a cipher key;
   obtaining the second conference data according to the encrypted first conference data and the cipher key;
   wherein prior to the encrypting the conference key with the security key provided by the cloud platform, the method further comprises:
   receiving the security key returned by the cloud platform in response to a key negotiation request transmitted by the conference transmission device;
   wherein the security key is generated according to a device service type and/or a device authentication type of the conference transmission device; and
   wherein the receiving the security key returned by the cloud platform in response to the key negotiation request transmitted by the conference transmission device comprises:
   receiving a first key obtained after the cloud platform encrypts the security key through a platform private key; and
   decrypting the first key through a pre-acquired platform public key, to obtain the security key.

2. The method of claim 1, wherein the conference key is calculated by the security enhancement module from module information; or
   the conference key is determined by the security enhancement module according to a data type of the first conference data.

3. A conference data transmission method for a security enhancement module, comprising:
   receiving unencrypted first conference data transmitted by a conference transmission device in a case where an identity verification of a participant is passed;
   acquiring a conference key corresponding to the first conference data, and encrypting the first conference data through the conference key, to obtain encrypted second conference data; and
   transmitting the encrypted second conference data to the conference transmission device, so that the conference transmission device provides the encrypted second conference data to a conference client through a cloud platform,
   wherein the identity verification of the participant comprises:
   receiving identity recognition data transmitted by the conference transmission device;
   matching the identity recognition data with security verification data pre-stored in the security enhancement module,
   determining an identity recognition result corresponding to the identity recognition data according to a matching result; and
   transmitting the identity recognition result to the conference transmission device, so that the conference transmission device performs the identity verification on the participant according to the identity recognition result; and wherein prior to the receiving the identity recognition data transmitted by the conference transmission device, the method further comprises:

receiving and storing the security verification data from an upper computer; wherein the security verification data from the upper computer is in a ciphertext form;

matching the identity recognition data with security verification data pre-stored in the security enhancement module, comprises:

decrypting the security verification data in the ciphertext form through a verification key, to obtain the security verification data in a plaintext form; and matching the identity recognition data with the security verification data in the plaintext form.

4. The method of claim 3, wherein the identity recognition data transmitted by the conference transmission device comprises device collection data for identifying the identity of the participant;

the security verification data comprises: feature data and identification information of a registered member;

the identity recognition result corresponding to the identity recognition data comprises: identification information of the participant;

wherein the device collection data comprises at least one of: face image data, iris image data, fingerprint data, and password data; and the identification information comprises: a name, a unique identifier, and profile information.

5. The method of claim 3, wherein prior to the identity verification of the participant, the method further comprises:

receiving and storing a platform certificate generated by the cloud platform in response to a device registration request;

adding auxiliary verification data for the platform certificate in response to an authentication instruction transmitted by the conference transmission device, to obtain a module certificate; and transmitting the module certificate to the conference transmission device, so that the conference transmission device provides the module certificate to the cloud platform for a device authentication;

wherein the identity verification of the participant is performed in a case where the device authentication is passed.

6. A conference data transmission method for a conference transmission device, comprising:

transmitting unencrypted first conference data to a security enhancement module in a case where an identity verification of a participant is passed;

receiving encrypted second conference data obtained by encrypting the first conference data through an acquired conference key by the security enhancement module; and transmitting the encrypted second conference data to a cloud platform, so that the cloud platform provides the second conference data to a conference client;

wherein the conference key is generated by the security enhancement module, and the second conference data further comprises: a cipher key obtained by encrypting the conference key through a security key provided by the cloud platform;

wherein prior to the receiving the encrypted second conference data obtained by encrypting the first conference data through the acquired conference key by the security enhancement module, the method further comprises:

transmitting a key negotiation request to the cloud platform; and providing the security key from the cloud platform to the security enhancement module according to a result returned by the cloud platform;

wherein the security key is generated according to a device service type and/or a device authentication type of the conference transmission device; and wherein the providing the security key from the cloud platform to the security enhancement module comprises:

transmitting a first key obtained by encrypting the security key by the cloud platform through a platform private key to the security enhancement module, so that the security enhancement module decrypts the first key through the pre-acquired platform public key, to obtain the security key.

7. The method of claim 6, wherein prior to the transmitting unencrypted first conference data to the security enhancement module, the method further comprises:

transmitting acquired identity recognition data to the security enhancement module;

receiving an identity recognition result returned by the security enhancement module after matching the identity recognition data with pre-stored security verification data;

matching the identity recognition result with personnel identity information in a participant configuration request received from the cloud platform, and verifying an identity of the participant according to a matching result.

8. The method of claim 6, wherein prior to the identity verification of the participant, the method further comprises:

transmitting a device registration request to the cloud platform, so that the security enhancement module receives and stores a platform certificate generated by the cloud platform in response to the device registration request;

transmitting an authentication instruction to the security enhancement module, so that the security enhancement module adds auxiliary verification data for the platform certificate, to obtain a module certificate; and transmitting the received module certificate from the security enhancement module to the cloud platform for a device authentication by the cloud platform.

9. An electronic device, comprising:

one or more processors;

a memory having one or more programs stored thereon that, when executed by the one or more processors, cause the one or more processors to implement the method of claim 1; and one or more I/O interfaces connected between the one or more processors and the memory and configured to enable information interaction between the one or more processors and the memory.

10. A non-transitory computer-readable storage medium having stored thereon a computer program which, when executed by a processor, implements the method of claim 1.

11. An electronic device, comprising:

one or more processors;

a memory having one or more programs stored thereon that, when executed by the one or more processors, cause the one or more processors to implement the method of claim 6; and one or more I/O interfaces connected between the one or more processors and the memory and configured to enable information interaction between the one or more processors and the memory.

\* \* \* \* \*